United States Patent
Jordan et al.

(12) 
(10) Patent No.: US 6,448,323 B1
(45) Date of Patent: *Sep. 10, 2002

(54) FILM COATINGS AND FILM COATING COMPOSITIONS BASED ON POLYVINYL ALCOHOL

(75) Inventors: Martin Philip Jordan, Orpington; James Taylor, Cobham, both of (GB)

(73) Assignee: BPSI Holdings, Inc., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/351,076

(22) Filed: Jul. 9, 1999

(51) Int. Cl.⁷ .................................................. C08K 3/34
(52) U.S. Cl. ..................... 524/451; 524/145; 524/377; 524/459
(58) Field of Search ................ 524/451, 459, 524/377, 145

(56) References Cited

U.S. PATENT DOCUMENTS

| | | | | |
|---|---|---|---|---|
| 3,935,326 A | * | 1/1976 | Groppenbatcher et al. | 27/3 |
| 4,060,598 A | * | 11/1977 | Groppenbatcher et al. | 424/20 |
| 4,432,965 A | * | 2/1984 | Keith et al. | 424/19 |
| 4,543,370 A | | 9/1985 | Porter et al. | |
| 4,665,648 A | * | 5/1987 | Branco et al. | 47/57.6 |
| 4,683,256 A | | 7/1987 | Porter et al. | |
| 5,697,922 A | * | 12/1997 | Thombre | 604/892.1 |
| 5,789,014 A | * | 8/1998 | Maruyama et al. | 427/2.14 |
| 5,885,617 A | * | 3/1999 | Jordan | 424/474 |

FOREIGN PATENT DOCUMENTS

| | | |
|---|---|---|
| JP | 54-28812 | 3/1979 |
| JP | 55-49312 | 4/1980 |
| JP | 59-42325 | 3/1994 |
| JP | 8-59512 | 3/1996 |

OTHER PUBLICATIONS

*An Application of Tack Measurement to Fluidized Bed Coating*, by L.S.C. Wan and W.F. Lai, Department of Pharmacy, University of Singapore,(Feb. 27, 1992).

*Drug Development and Industrial Pharmacy*, 17 (12), 1655–1683 (1991), "Preparation and Evaluation of Eudragit Acrylic Resin for Controlled Drug Release of Pseudoephedrin Hydrochloride" by Shun Por Li, Kenneth M. Feld, and Chane R. Kowarski.

*The Effects of Pigment Type and Concentration on the Incidence of Edge Splitting on Film–coating Tablets*, by R.C. Rowe, Pharm. Acta Helv. 57 Nr. 8, pp. 221–225, (1982).

*Effects of Plasticizers and Titanium Dioxide on the Properties of Polyvinylalcohol Coatings Used in Enzyme Granules*, M.S. Gerbert, E.R. Hsu, M.J. Flynn, N.T. Becker and A.L. Gaertner, Proceed Int'l. Symp. Control. Ref. Bioact. Mater., 26, Controlled Release Society, Inc., (1999).

* cited by examiner

Primary Examiner—Edward J. Cain
(74) Attorney, Agent, or Firm—Roberts & Mercanti, LLP

(57) ABSTRACT

A dry film coating composition for use in coating pharmaceutical tablets, nutritional supplements, food, confectionery forms, agricultural seeds, and the like, comprises polyvinyl alcohol, a plasticizer such as polyethylene glycol or glycerin, talc, and preferably a pigment/opacifier and lecithin. A method of coating substrates such as pharmaceutical tablets, nutritional supplements, food, confectionery forms, agricultural seeds, and the like, with a film coating, comprises the steps of mixing polyvinyl alcohol, a plasticizer such as polyethylene glycol or glycerin, talc, and preferably a pigment/opacifier and lecithin into water to form an aqueous coating dispersion, applying an effective amount of said coating dispersion onto said substrates to form a film coating on said substrates, and drying the film coating on said substrates.

58 Claims, No Drawings

FILM COATINGS AND FILM COATING COMPOSITIONS BASED ON POLYVINYL ALCOHOL

BACKGROUND OF THE INVENTION

1. Field of the Invention

This invention relates to the field of aqueous film coating of substrates like pharmaceutical tablets, nutritional supplements, food, confectionery forms, agricultural seeds, and the like, and is specifically concerned with coating substrates with a coating based on polyvinyl alcohol.

2. Description of the Prior Art

The use of the polymer polyvinyl alcohol (PVA) as a film coating has been previously suggested. However, practical usage has been inhibited by the stickiness of grades of the polymer which have rapid solubility in cold water to render them economical to use in current aqueous film coating processes.

Colorcon's U.S. patent application, Ser. No. 08/466,939 (now U.S. Pat. No. 5,885,617), which is incorporated herein by reference, discloses a moisture barrier film coating composition for forming a moisture barrier film coating for pharmaceutical tablets which comprises polyvinyl alcohol, lecithin, and optionally, a flow aid, and/or a colorant, and/or suspending agent. This coating composition is sold by Colorcon, of West Point, Pa., under the trademark OPADRY AMB.

OPADRY AMB coating compositions produce film coatings having excellent moisture barrier properties. However, due to the inherent tackiness of PVA, the spray rate for coating pharmaceutical tablets in an O'Hara Lab Coat I coater fitted with a 24" pan containing 12 kilograms of tablets using a aqueous film coating solution/dispersion formed from an OPADRY AMB coating composition is slow (about 25 to 30 grams/minute compared to other types of coating systems which can be sprayed at 50 to 70 grams/min). While a slow spray rate is a disadvantage, such a disadvantage is outweighed by the moisture barrier properties obtained from the OPADRY AMB coating composition, for the special application when a moisture barrier film coating is required to coat a pharmaceutical substrate.

For general purpose use (e.g., where moisture barrier properties are not required), a slow spray rate is not acceptable due to the additional processing costs that are associated with a slow spray rate.

Polyethylene glycol is a known plasticizer used in film coatings to reduce the glass transition temperature of the film forming polymer and to make the polymer less brittle. Inclusion of polyethylene glycol in a coating system would be expected to result in making the coating system more tacky, as predicted by the Williams-Landel-Ferry equation. Accordingly, adding polyethylene glycol to PVA, which is already very tacky, would be expected to result in making the coating system even more tacky, thereby making the problem of tackiness of PVA even worse.

Also, to those skilled in the art, it is well recognized that adding polyethylene glycol to a film coating system generally results in a reduction of the tensile strength of the film coating. A lower tensile strength means a weaker film, which is a drawback.

Also, to those skilled in the art, polyethylene glycol would be expected to compromise the moisture barrier properties of a PVA film coating.

Insoluble materials such as pigments, glidants, and flow aids commonly are used in film coating compositions. For instance, pigment is used to provide a color to the film coating and talc is used as a glidant and a filler to reduce the percentage of the amount of other more costly components in the film coating composition. Use of insoluble materials in the film coating composition may not be haphazard since, as is well recognized by those skilled in the art, adding insoluble materials to a film coating composition typically decreases the tensile strength of the film coating, which means a weaker film is obtained as the amount of insoluble materials in the film coating increases.

Keith et al. U.S. Pat. No. 4,432,965 discloses a sustained release oral dosage form comprising a tablet core containing a pharmaceutically effective amount of quinidine which is coated with a sustained released polymeric coating which contains about 5 to about 20% by weight polyethylene glycol and from about 80 to 95% by weight polyvinyl alcohol. Keith et al. U.S. Pat. No. 4,432,965 discloses that their sustained release coating of PVA and polyethylene glycol dissolves slowly in gastric and intestinal fluids.

SUMMARY OF THE INVENTION

It is an object of the invention to provide a coating based on polyvinyl alcohol that has a smooth surface, a shiny gloss, minimal tackiness, good film adhesion, and good tensile strength.

Another object of the invention is to provide a film coating based on polyvinyl alcohol which may be sprayed onto substrates such as pharmaceutical tablets, nutritional supplements, food, confectionery forms, agricultural seeds, and the like at a coating solution spray rate of about 55 to 60 grams per minute. Another object of the invention is to provide a film coating that is fast dissolving.

These and other objects are accomplished by our invention, which is described below.

DETAILED DESCRIPTION OF THE INVENTION

In accordance with the invention, the inventive dry film coating composition for use in coating pharmaceutical tablet, nutritional supplement, food, confectionery forms, agricultural seed, and the like, comprises 1) polyvinyl alcohol, 2) a plasticizer such as polyethylene glycol or glycerin, and 3) talc.

Preferably, the inventive dry film coating composition includes one or more of the following components: a pigment/opacifier and lecithin.

In accordance with the invention, a method of coating substrates, such as pharmaceutical tablets, nutritional supplements, food, confectionery forms, agricultural seeds, and the like with a film coating, comprises the steps of mixing 1) polyvinyl alcohol, 2) a plasticizer such as polyethylene glycol or glycerin, and 3) talc into water to form an aqueous coating dispersion, applying an effective amount of the coating dispersion onto the substrates to form a film coating on the substrates, and drying the film coating on the substrates. optionally, but preferably, one or more of the following components is/are mixed into water with the polyvinyl alcohol, the plasticizer, and the talc to form the inventive coating dispersion: a pigment/opacifier and lecithin.

The invention also includes the aqueous coating dispersion, the coated substrates, such as coated pharmaceutical tablets, coated nutritional supplements, coated food products, coated confectionery forms, coated agricultural seeds, and the like, and the method of making the dry film coating compositions and the method of making the coating dispersion of the invention.

Polyvinyl alcohol (PVA) is the film former of the coating. The grades of polyvinyl alcohol found useful under the invention correspond to polyvinyl alcohol that comprises partially hydrolyzed polyvinyl acetate which has a percentage of hydrolysis greater than about 86.5 mol. % and preferably in a range of about 86.5 to 89.0 mol. %.

Preferably, the polyvinyl alcohol is micronized to facilitate dissolving the polyvinyl alcohol into the water when forming the aqueous coating solution. Preferably, the particle size of the micronized polyvinyl alcohol falls in the following quanities and mesh sizes: 47.8% is greater than 200 microns; 28.7% is between 200 and 145 microns; 22.9% is between 145 and 100 microns; 0.5% is between 100 and 80 microns; and 0.1% is between 80 microns.

The polyethylene glycol is a plasticizer for making the coating of the invention non-brittle and non-cracking. Polyethylene glycol having a nominal molecular weight of greater than 1000 has been found useful, and polyethylene glycol having a molecular weight of 3000 is preferred.

Glycerin, another plasticizer, may be substituted for the polyethylene glycol. Unexpectedly, we have found that rather than increasing the tackiness of the film coating as would be expected, glycerin, when used in the inventive coating composition, reduces the tackiness of the resultant film coating by surprisingly acting as a mild detackifier.

The talc is a glidant, and the talc helps improve the smoothness of the final coating since the talc facilitates the tumbling of tablets over one another during coating. Unexpectedly, the talc, in an amount between about 9% and about 45%, and preferably between about 9% and 20%, and more preferably at about 10%, by weight of the coating composition produces an increase in the tensile strength in the film coating, resulting in a stronger film. This is highly unexpected since it would be expected that the tensile strength of a film coating would decrease as the amount of an insoluble component, such as talc, increases in the film coating composition.

The pigment/opacifier may be any food approved colors, opacifiers, or dyes. For example, the pigment/opacifier may be aluminum lakes, iron oxides, titanium dioxide, or natural colors. Examples of such pigments/opacifiers are listed in Colorcon U.S. Pat. No. 4,543,570 issued Sep. 24, 1985 which is incorporated herein by reference.

The lecithin is a detackifier. We have found: 1) the lecithin also acts as a surfactant by helping the wetting of the components of the aqueous coating dispersion; the lecithin helps solvate the polyvinyl alcohol; and the lecithin has a plasticizing effect by locking moisture in the coating so the coating stays flexible and does not become brittle.

The ranges of each component of the dry coating composition of the invention are as follows, by weight:

| COMPONENT | ACCEPTABLE RANGES (%) | PREFERRED RANGES (%) |
|---|---|---|
| polyvinyl alcohol | 25 to 55 | 38 to 46 |
| polyethylene glycol (or glycerin) | 5 to 30 | 10 to 25 |
| talc | 9 to 45 | 9 to 20 |
| pigment/opacifier | 0 to 40 | 20 to 30 |
| lecithin | 0 to 10 | 0 to 4 |

The following examples illustrate the invention. All units and percentages in the examples are by weight.

EXAMPLE 1

The dry components of the following formulation are blended together in a dry powder mill, such as a PK blender, for 25 minutes or until an homogenous mixture is achieved, resulting in one formulation of the inventive dry film coating composition.

Optionally, the dry film coating composition of the invention may be granulated using a planetary mixer, such as a Hobart planetary mixer. After the dry film coating composition is loaded into the mixer and the mixer is switched on, sufficient water is slowly added until the composition forms slightly adherent granules. These granules are then passed through a 1–2 mm screen and then dried in a 30° C. oven until the moisture content is below 5%. The composition is then sieved again through a 1–2 mm screen and then is ready for use in a nondusting, granular form. If not optionally granulated, the composition may be milled such as in a hammer mill (Apex Machinery, Dartford, England), for example. Other methods of granulation which may be used are spray granulation and roller compaction.

300 grams of the resulting film coating composition is dispersed into 1200 grams of distilled water to form an inventive coating dispersion (20% solids), and 1500 grams of this dispersion is sprayed onto 10 kilograms of tablets using a coater to form the inventive coating on the tablets having a theoretical weight gain of 3%. The tablets are rotated in the coater at a rotation speed of 12–14 rpm. Hot air at 60° C. to 70° C. is used to evaporate the water in the sprayed coating dispersion and to maintain the tablets at 38° C.–42° C. The spraying rate of coating dispersion during coating is 60 grams per minute.

Upon completion of the coating process, the tablets show a smooth surface with excellent logo definition. The film coating on the tablets possesses an excellent long-lasting shinny gloss, minimal tackiness, good film adhesion, and good tensile strength (about 10–15 MPa).

| Component | Percentages | Grams |
|---|---|---|
| Polyvinyl Alcohol | 44.00% | 440.0 |
| Talc | 20.00% | 200.0 |
| Pigments/Opacifier | 20.15% | 201.5 |
| PEG 3000 | 12.35% | 123.5 |
| Lecithin | 03.50% | 35.0 |
| | 100.00% | 1000.0 |

In the following examples 2–16, the components of each formulation are mixed together, formed into a coating solution, and applied to tablets, as in Example 1, to obtain film coatings possessing a smooth surface, an excellent long-lasting shinny gloss, minimal tackiness, good film adhesion, and good tensile strength typically between about 10 MPa and about 16 MPa.

EXAMPLE 2

| Component | Percentages | Grams |
|---|---|---|
| Polyvinyl Alcohol | 44.00% | 440.0 |
| Talc | 20.00% | 200.0 |
| Titanium dioxide | 20.15% | 201.5 |

-continued

| Component | Percentages | Grams |
|---|---|---|
| PEG 3000 | 12.35% | 123.5 |
| Lecithin | 3.50% | 35.0 |
| | 100.00% | 1000.0 |

EXAMPLE 3

| Component | Percentages | Grams |
|---|---|---|
| Polyvinyl Alcohol | 35.00% | 350.0 |
| Talc | 25.00% | 250.0 |
| Pigments/Opacifier | 29.00% | 290.0 |
| PEG 3000 | 11.00% | 110.0 |
| | 100.00% | 1000.0 |

EXAMPLE 4

| Component | Percentages | Grams |
|---|---|---|
| Polyvinyl Alcohol | 25.00% | 250.0 |
| Talc | 25.42% | 254.2 |
| Pigments/Opacifier | 27.08% | 270.8 |
| PEG 3000 | 17.08% | 170.8 |
| Lecithin | 5.42% | 54.2 |
| | 100.00% | 1000.0 |

EXAMPLE 5

| Component | Percentages | Grams |
|---|---|---|
| Polyvinyl Alcohol | 35.00% | 350.0 |
| Talc | 35.00% | 350.0 |
| PEG 3000 | 20.00% | 200.0 |
| Lecithin | 10.00% | 100.0 |
| | 100.00% | 1000.0 |

EXAMPLE 6

| Component | Percentages | Grams |
|---|---|---|
| Polyvinyl Alcohol | 44.00% | 440.0 |
| Talc | 18.35% | 183.5 |
| Pigments/Opacifier | 20.15% | 201.5 |
| PEG 3000 | 14.00% | 140.0 |
| Lecithin | 3.50% | 35.0 |
| | 100.00% | 1000.0 |

EXAMPLE 7

| Component | Percentages | Grams |
|---|---|---|
| Polyvinyl Alcohol | 44.00% | 440.0 |
| Talc | 20.00% | 200.0 |
| PEG 3000 | 10.00% | 123.5 |
| Lecithin | 3.50% | 35.0 |
| | 100.00% | 1000.0 |

EXAMPLE 8

| Ccmnonent | Percentages | Grams |
|---|---|---|
| Polyvinyl Alcohol | 44.00% | 440.0 |
| Talc | 20.00% | 200.0 |
| Pigments/Opacifier | 20.00% | 200.0 |
| PEG 3000 | 12.00% | 120.0 |
| Lecithin | 4.00% | 40.0 |
| | 100.00% | 1000.0 |

EXAMPLE 9

| Component | Percentages | Grams |
|---|---|---|
| Polyvinyl Alcohol | 44.65% | 446.5 |
| Talc | 20.00% | 200.0 |
| Pigments/Opacifier | 20.00% | 200.0 |
| PEG 3000 | 15.35% | 153.5 |
| | 100.00% | 1000.0 |

EXAMPLE 10

| Component | Percentages | Grams |
|---|---|---|
| Polyvinyl Alcohol | 44.00% | 440.0 |
| Talc | 20.00% | 200.0 |
| Pigments/Opacifier | 20.15% | 201.5 |
| PEG 3000 | 12.35% | 123.5 |
| Lecithin | 3.50% | 35.0 |
| | 100.00% | 1000.0 |

EXAMPLE 11

| Component | Percentages | Grams |
|---|---|---|
| Polyvinyl Alcohol | 44.00% | 440.0 |
| Talc | 10.00% | 100.0 |
| Pigments/Opacifier | 30.15% | 301.5 |
| PEG 3000 | 12.35% | 123.5 |
| Lecithin | 3.50% | 35.0 |
| | 100.00% | 1000.0 |

EXAMPLE 12

| Component | Percentages | Grams |
| --- | --- | --- |
| Polyvinyl Alcohol | 46.00% | 460.0 |
| Talc | 18.00% | 180.0 |
| Pigments/Opacifier | 20.15% | 201.5 |
| PEG 3000 | 12.35% | 123.5 |
| Lecithin | 3.50% | 35.0 |
| | 100.00% | 1000.0 |

EXAMPLE 13

| Component | Percentages | Grams |
| --- | --- | --- |
| Polyvinyl Alcohol | 38.00% | 380.0 |
| Talc | 20.00% | 200.0 |
| Pigments/Opacifier | 26.15% | 261.5 |
| PEG 3000 | 12.35% | 123.5 |
| Lecithin | 3.50% | 35.0 |
| | 100.00% | 1000.0 |

EXAMPLE 14

| Component | Percentages | Grams |
| --- | --- | --- |
| Polyvinyl Alcohol | 44.00% | 440.0 |
| Talc | 10.15% | 101.5 |
| Pigments/Opacifier | 30.00% | 300.0 |
| PEG 3000 | 12.35% | 123.5 |
| Lecithin | 3.50% | 35.0 |
| | 100.00% | 1000.0 |

EXAMPLE 15

| Component | Percentages | Grams |
| --- | --- | --- |
| Polyvinyl Alcohol | 44.63% | 446.3 |
| Talc | 19.85% | 198.5 |
| Pigments/Opacifier | 20.00% | 200.0 |
| PEG 3000 | 12.86% | 128.6 |
| Lecithin | 2.66% | 26.6 |
| | 100.00% | 1000.0 |

EXAMPLE 16

| Component | Percentages | Grams |
| --- | --- | --- |
| Polyvinyl Alcohol | 47.65% | 47.65 |
| Talc | 19.67% | 19.67 |
| Soya Lecithin | 6.33% | 6.33 |
| Glycerin | 5.35% | 5.35 |
| TiO$_2$ | 2.31% | 2.31 |
| FD&C Red 40 Lake | 15.08% | 15.08 |
| FD&C Yellow 6 Lake | 3.41% | 3.41 |
| FD&C Blue 2 Lake | 0.20% | 0.20 |
| | 100.00% | 1000.0 |

The dry ingredients of the above formulation are loaded into a suitably-sized food processor and blended vigorously for 5 minutes until homogeneous. After 5 minutes, the liquid portion of the formulation (glycerin, a plasticizer), is added to the processor and blending continues for an additional 3 minutes to create a dry coating composition of the invention. 90 grams of this formulation is then dispersed into 360 grams of purified water and stirred for 45 minutes to form an aqueous coating dispersion of 20.0% solids that is ready for spray coating.

A 3.0 kilogram charge of mixed tablets consisting of 2.0 kg of ⅜" standard concave placebos and 1.0 kg of 5 grain aspirin cores of similar diameter is loaded into a 15" O'Hara Labcoat I coating pan with 4 mixing baffles and 6 anti-slide bars. The aqueous coating dispersion is sprayed onto the tablet bed using 1 Spraying System Gun, ⅛ VAU SS and a Masterflex digital console peristaltic pump with 1 7518-02 pumphead. During the coating procedure, the atomizing air is 25 psi, pattern air is 35 psi, inlet air temperature is 70° C., outlet air is 48° C., the tablet bed temperature remains at 41° C., the pan speed is 16 rpm, the coating liquid feed rate is 20 g/min (which is equivalent to 50–60 grams/minute in the O'Hara Lab Coat I coater fitted with a 24" pan), and the total coating time is 22 minutes. A theoretical 3.0% dry coating weight gain is applied and the film coating on the tablets possesses an excellent long-lasting shiny gloss, minimal tackiness, good adhesion, and good tensile strength (about 10–15 MPa).

Regarding preparation of the inventive aqueous coating dispersion, it also may be prepared by adding the individual components of the inventive coating composition directly into water and then mixing to form the coating dispersion.

Preferably, the coating dispersion is prepared at a solids level of between 10% and 30%.

We have found that, in contrast to what is predicted by the Williams-Landel-Ferry equation, our invention produces a film coating with minimal tackiness.

We have found that coating solution spray rates of about 60 grams/minute (in a 24" pan containing 12 kilograms of tablets) may be obtained using the aqueous coating dispersions of the invention. This is unexpected because, to those skilled in the art, it is known that very tacky polymers require slow spray rates due to their tackiness. Accordingly, PVA, being a very tacky polymer, would be expected to require slow spray rates. For instance, coating solutions formed from Colorcon's PVA-based OPADRY AMB coating compositions require a slow spray rate (e.g., 25–30 grams/minute in a 24" pan containing 12 kilograms of tablets) due to the tackiness of PVA in the coating solution.

To those skilled in the art, it is well recognized that adding insoluble materials such as pigments, glidants, and flow aids, for example, to a film coating composition typically decreases the tensile strength of the film coating. Surprisingly, we have found that the inclusion of talc, which is an insoluble material in the inventive coating composition used as a glidant and a filler, in the inventive film coating composition in an amount between about 9% and about 45%, and preferably between about 9% and 20%, and more preferably at about 10%, by weight of the coating composition and in the inventive film coating dispersion in an amount between about 9% and about 45%, and preferably between about 9% and 20%, and more preferably about 10%, by weight of the non-water ingredients of the film coating dispersion produces an increase in the tensile strength of the film coating, rather than decreasing the tensile strength. Accordingly, in accordance with the invention, talc may be used in amounts that reduce the amount of PVA in the film coating, thereby reducing the cost of the film coating composition, without the trade-off of a reduction of tensile strength of the film coating.

We also have found that the inventive coating has good moisture barrier properties. This, too, is surprising and unexpected because polyethylene glycol and similar plasticizers are hydrophilic and would be expected to reduce the moisture barrier properties of PVA. While the water vapor transmission rate for a film coating made from an OPADRY film coating composition comprising hydroxypropyl methylcellulose and polyethylene glycol is about 40, and the water vapor transmission rate for a film coating made from an OPADRY AMB coating composition not having any polyethyelene glycol in it is about 6, the water vapor transmission rate for a film coating made in accordance with the invention is about 10.

Further, in contrast to the teachings of Keith et al. U.S. Pat. No. 4,432,965, we have found that tablets coated with inventive film coating is fast dissolving.

We claim:

1. A dry film coating composition for use in coating pharmaceutical tablets, nutritional supplements, food, confectionery forms, and agricultural seeds, comprising
   polyvinyl alcohol, the polyvinyl alcohol being in a range of about 25% to about 55% by weight of the composition,
   a plasticizer, the plasticizer being polyethylene glycol or glycerin and
   talc,
   the talc comprising about 9% to about 45% by weight of the composition.
2. The coating composition of claim 1,
   the polyvinyl alcohol comprising partially hydrolyzed polyvinyl acetate which has a percentage of hydrolysis greater than about 86.5 mol. %.
3. The coating composition of claim 1,
   the polyvinyl alcohol comprising partially hydrolyzed polyvinyl acetate which has a percentage of hydrolysis in a range of about 86.5 to 89.0 mol. %.
4. The coating composition of claim 1,
   the polyvinyl alcohol being in a range of about 25% to about 55% by weight of the composition.
5. The coating composition of claim 1,
   the polyvinyl alcohol being in a range of about 38% to about 46% by weight of the composition.
6. The coating composition of claim 1,
   the plasticizer being polyethylene glycol or glycerin.
7. The coating composition of claim 1,
   the polyethylene glycol having a molecular weight of 400 to 20,000.
8. The coating composition of claim 1,
   the polyethylene glycol having a molecular weight of 3,000.
9. The coating composition of claim 1,
   the plasticizer being in a range of about 5% to about 30% by weight of the composition.
10. The coating composition of claim 1,
    the plasticizer being in a range of about 10% to about 25% by weight of the composition.
11. The coating composition of claim 1,
    the talc being in a range of about 9% to about 20% by weight of the composition.
12. The coating composition of claim 10,
    the talc being about 10% by weight of the composition.
13. The coating composition of claim 1, further including a pigment/opacifier.
14. The coating composition of claim 13,
    the pigment/opacifier being in a range of about 0% to about 40% by weight of the composition.
15. The coating composition of claim 13,
    the pigment/opacifier being in a range of about 20% to about 30% by weight of the composition.
16. The coating composition of claim 1, further including a lecithin.
17. The coating composition of claim 16,
    the lecithin being in a range of about 0% to about 10% by weight of the composition.
18. The coating composition of claim 16,
    the lecithin being in a range of about 0% to about 4% by weight of the composition.
19. The coating composition of claim 1, further including a pigment/opacifier and lecithin,
    the polyvinyl alcohol comprising partially hydrolyzed polyvinyl acetate which has a percentage of hydrolysis greater than about 86.5 mol. %,
    the polyethylene glycol having a molecular weight of 400 to 20,000,
    the polyethylene glycol or glycerin being in a range of about 5% to about 30% by weight of the composition,
    the pigment/opacifier being in a range of about 0% to about 40% by weight of the composition, and
    the lecithin being in a range of about 0% to about 10% by weight of the composition.
20. The coating composition of claim 1, further including a pigment/opacifier and lecithin,
    the polyvinyl alcohol comprising partially hydrolyzed polyvinyl acetate which has a percentage of hydrolysis in a range of about 86.5 to 89.0 mol. %,
    the polyvinyl alcohol being in a range of about 38% to about 46% by weight of the composition,
    the polyethylene glycol having a molecular weight of 3000,
    the polyethylene glycol or glycerin being in a range of about 10% to about 25% by weight of the composition,
    the talc being in a range of about 9% to about 20% by weight of the composition,
    the pigment/opacifier being in a range of about 20% to about 30% by weight of the composition, and
    the lecithin being in a range of about 0% to about 4% by weight of the composition.
21. A liquid film coating dispersion for use in coating pharmaceutical tablets, nutritional supplements, food, confectionery forms, and agricultural seeds comprising
    polyvinyl alcohol, the polyvinyl alcohol being in a range of about 25% to about 55% by weight of the non-water ingredients of the aqueous coating dispersion,
    a plasticizer, the plasticizer being polyethylene glycol or glycerin,
    talc,
    the talc comprising about 9% to about 45% by weight of the non-water ingredients of the aqueous coating dispersion, and water.

22. The dispersion of claim 21,
the polyvinyl alcohol comprising partially hydrolyzed polyvinyl acetate which has a percentage of hydrolysis greater than about 86.5 mol. %.

23. The dispersion of claim 21,
the polyvinyl alcohol comprising partially hydrolyzed polyvinyl acetate which has a percentage of hydrolysis in a range of about 86.5 to 89.0 mol. %.

24. The dispersion of claim 21,
the polyvinyl alcohol being in a range of about 25% to about 55% by weight of the non-water ingredients of aqueous coating dispersion.

25. The dispersion of claim 21,
the polyvinyl alcohol being in a range of about 38% to about 46% by weight of the non-water ingredients of the aqueous coating dispersion.

26. The dispersion of claim 21,
the polyethylene glycol having a molecular weight of 400 to 20,000.

27. The dispersion of claim 21,
the polyethylene glycol having a molecular weight of 3,000.

28. The dispersion of claim 21,
the polyethylene glycol or glycerin being in a range of about 5% to about 30% by weight of the non-water ingredients of the aqueous coating dispersion.

29. The dispersion of claim 21,
the polyethylene glycol being or glycerin in a range of about 10% to about 25% by weight of the non-water ingredients of the aqueous coating dispersion.

30. The dispersion of claim 21,
the talc being in a range of about 9% to about 20% by weight of the non-water ingredients of the aqueous coating dispersion.

31. The dispersion of claim 21,
the talc being about 10% by weight of the non-water ingredients of the aqueous coating dispersion.

32. The dispersion of claim 21, further including dispersing a pigment/opacifier into the aqueous coating dispersion.

33. The dispersion of claim 32,
the pigment/opacifier being in a range of about 0% to about 40% by weight of the non-water ingredients of the aqueous coating dispersion.

34. The dispersion of claim 32,
the pigment/opacifier being in a range of about 20% to about 30% by weight of the non-water ingredients of the aqueous coating dispersion.

35. The dispersion of claim 21, further including dispersing lecithin into the aqueous coating dispersion.

36. The dispersion of claim 35,
the lecithin being in a range of about 0% to about 10% by weight of the non-water ingredients of the aqueous coating dispersion.

37. The dispersion of claim 35,
the lecithin being in a range of about 0% to about 4% by weight of the non-water ingredients of the aqueous coating dispersion.

38. The dispersion of claim 21, further including dispersing a pigment/opacifier and lecithin into the aqueous coating dispersion,
the polyvinyl alcohol comprising partially hydrolyzed polyvinyl acetate which has a percentage of hydrolysis greater than about 86.5 mol. %,
the polyethylene glycol having a molecular weight of 400 to 20,000,
the polyethylene glycol or glycerin being in a range of about 5% to about 30% by weight of the non-water ingredients of the aqueous coating solution,
the pigment/opacifier being in a range of about 0% to about 40% by weight of the non-water ingredients of the aqueous coating dispersion, and
the lecithin being in a range of about 0% to about 10% by weight of the non-water ingredients of the aqueous coating dispersion.

39. The dispersion of claim 21, further including dispersing a pigment/opacifier and lecithin into the aqueous coating dispersion,
the polyvinyl alcohol comprising partially hydrolyzed polyvinyl acetate which has a percentage of hydrolysis in a range of about 86.5 to 89.0 mol. %,
the polyvinyl alcohol being in a range of about 38% to about 46% by weight of the non-water ingredients of the aqueous coating dispersion,
the polyethylene glycol having a molecular weight of 3000,
the polyethylene glycol or glycerin being in a range of about 10% to about 25% by weight of the non-water ingredients of the aqueous coating dispersion,
the talc being in a range of about 9% to about 20% by weight of the non-water ingredients of the aqueous coating dispersion,
the pigment/opacifier being in a range of about 20% to about 30% by weight of the non-water ingredients of the aqueous coating dispersion, and
the lecithin being in a range of about 0% to about 4% by weight of the non-water ingredients of the aqueous coating dispersion.

40. A method of coating substrates such as pharmaceutical tablets, nutritional supplements, food, confectionery forms, agricultural seeds, and the like, with a film coating, comprising the steps of
mixing polyvinyl alcohol, a plasticizer, and talc into water to form an aqueous coating dispersion,
the talc being in a range of about 9% to about 45% by weight of the non-water ingredients of the aqueous coating dispersion,
applying an effective amount of said coating dispersion onto said substrates to form a film coating on said substrates, and
drying the film coating on said substrates.

41. The method of claim 40,
the polyvinyl alcohol comprising partially hydrolyzed polyvinyl acetate which has a percentage of hydrolysis greater than about 86.5 mol. %.

42. The method of claim 40,
the polyvinyl alcohol comprising partially hydrolyzed polyvinyl acetate which has a percentage of hydrolysis in a range of about 86.5 to 89.0 mol. %.

43. The method of claim 40,
the polyvinyl alcohol being in a range of about 25% to about 55% by weight of the non-water ingredients of aqueous coating dispersion.

44. The method of claim 40,
the polyvinyl alcohol being in a range of about 38% to about 46% by weight of the non-water ingredients of the aqueous coating dispersion.

45. The method of claim 40,
the plasticizer being polyethylene glycol having a molecular weight of 400 to 20,000.

46. The method of claim 40,
the plasticizer being polyethylene glycol having a molecular weight of 3,000.

47. The method of claim 40,
the plasticizer being polyethylene glycol or glycerin in a range of about 5% to about 30% by weight of the non-water ingredients of the aqueous coating dispersion.

48. The method of claim 40,
the plasticizer being polyethylene glycol or glycerin in a range of about 10% to about 25% by weight of the non-water ingredients of the aqueous coating dispersion.

49. The method of claim 40,
the talc being in a range of about 9% to about 20% by weight of the non-water ingredients of the aqueous coating dispersion.

50. The method of claim 40,
the talc being about 10% by weight of the non-water ingredients of the aqueous coating dispersion.

51. The method of claim 40, further including dispersing a pigment/opacifier into the aqueous coating dispersion.

52. The method of claim 51,
the pigment/opacifier being in a range of about 0% to about 40% by weight of the non-water ingredients of the aqueous coating dispersion.

53. The method of claim 51,
the pigment/opacifier being in a range of about 20% to about 30% by weight of the non-water ingredients of the aqueous coating dispersion.

54. The method of claim 40, further including dispersing lecithin into the aqueous coating dispersion.

55. The method of claim 54,
the lecithin being in a range of about 0% to about 10% by weight of the non-water ingredients of the aqueous coating dispersion.

56. The method of claim 54,
the lecithin being in a range of about 0% to about 4% by weight of the non-water ingredients of the aqueous coating dispersion.

57. The method of claim 40, further including dispersing a pigment/opacifier and lecithin into the aqueous coating dispersion,
the polyvinyl alcohol comprising partially hydrolyzed polyvinyl acetate which has a percentage of hydrolysis greater than about 86.5 mol. %,
the polyvinyl alcohol being in a range of about 25% to about 55% by weight of the non-water ingredients of the aqueous coating dispersion,
polyethylene glycol having a molecular weight of 400 to 20,000,
the polyethylene glycol or glycerin being in a range of about 5% to about 30% by weight of the non-water ingredients of the aqueous coating dispersion,
the pigment/opacifier being in a range of about 0% to about 40% by weight of the non-water ingredients of the aqueous coating dispersion, and
the lecithin being in a range of about 0% to about 10% by weight of the non-water ingredients of the aqueous coating dispersion.

58. The method of claim 40, further including dispersing a pigment/opacifier and lecithin into the aqueous coating dispersion,
the polyvinyl alcohol comprising partially hydrolyzed polyvinyl acetate which has a percentage of hydrolysis in a range of about 86.5 to 89.0 mol. %,
the polyvinyl alcohol being in a range of about 38% to about 46% by weight of the non-water ingredients of the aqueous coating dispersion,
polyethylene glycol having a molecular weight of 3000,
the polyethylene glycol or glycerin being in a range of about 10% to about 25% by weight of the non-water ingredients of the aqueous coating dispersion,
the talc being in a range of about 9% to about 20% by weight of the non-water ingredients of the aqueous coating dispersion,
the pigment/opacifier being in a range of about 20% to about 30% by weight of the non-water ingredients of the aqueous coating dispersion, and
the lecithin being in a range of about 0% to about 4% by weight of the non-water ingredients of the aqueous coating dispersion.

* * * * *